(12) United States Patent
Kwon et al.

(10) Patent No.: US 11,738,644 B2
(45) Date of Patent: *Aug. 29, 2023

(54) DISPLAY APPARATUS FOR VEHICLE AND METHOD THEREOF

(71) Applicants: Hyundai Motor Company, Seoul (KR); Kia Motors Corporation, Seoul (KR)

(72) Inventors: Su Jin Kwon, Gyeonggi-do (KR); Bum Hee Chung, Seoul (KR); Paul Choo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 462 days.

This patent is subject to a terminal disclaimer.

(21) Appl. No.: 17/002,539

(22) Filed: Aug. 25, 2020

(65) Prior Publication Data
US 2021/0323405 A1 Oct. 21, 2021

(30) Foreign Application Priority Data
Apr. 21, 2020 (KR) .................. 10-2020-0048168

(51) Int. Cl.
 *B60K 35/00* (2006.01)
(52) U.S. Cl.
 CPC ........ *B60K 35/00* (2013.01); *B60K 2370/152* (2019.05); *B60K 2370/164* (2019.05); *B60K 2370/165* (2019.05); *B60K 2370/166* (2019.05); *B60K 2370/188* (2019.05)

(58) Field of Classification Search
 CPC .............. B60K 35/00; B60K 2370/152; B60K 2370/164; B60K 2370/165; B60K 2370/166; B60K 2370/188; B60K 2370/191; B60K 37/06; G01C 21/3638; G01C 21/3667
 See application file for complete search history.

(56) References Cited

U.S. PATENT DOCUMENTS

| 6,169,552 B1 | 1/2001 | Endo et al. | |
| 9,459,115 B1 | 10/2016 | Elliott et al. | |
| 2007/0057781 A1* | 3/2007 | Breed | B60K 35/00 340/457.1 |
| 2011/0166783 A1* | 7/2011 | Ren | G06T 17/05 701/455 |

(Continued)

OTHER PUBLICATIONS

Office Action for U.S. Appl. No. 17/002,411 dated Sep. 23, 2022, 33 pages.

(Continued)

*Primary Examiner* — Richard M Camby
(74) *Attorney, Agent, or Firm* — Fox Rothschild LLP

(57) ABSTRACT

A display apparatus for a vehicle includes: a controller configured to create a 3D map based on a neon view by selecting essential information among map information; and a display device configured to display the 3D map based on the neon view created by the controller, wherein the controller displays a structure on a background screen of the map information by using a shadow or displays the structure on a dark background screen by using an outline of the structure when the 3D map based on the neon view is created.

22 Claims, 21 Drawing Sheets

(56) References Cited

U.S. PATENT DOCUMENTS

| | | |
|---|---|---|
| 2011/0264362 A1* | 10/2011 | Van Raamsdonk ..... G06T 17/05 |
| | | 345/422 |
| 2011/0313653 A1 | 12/2011 | Lindner |
| 2013/0322634 A1 | 12/2013 | Bennett et al. |
| 2016/0003636 A1 | 1/2016 | Ng-Thow-Hing et al. |
| 2016/0138933 A1 | 5/2016 | Yamaguchi et al. |
| 2017/0205885 A1* | 7/2017 | Schpok .................. G01C 21/26 |
| 2017/0285648 A1* | 10/2017 | Welty ..................... G06V 20/10 |
| 2018/0195877 A1 | 7/2018 | Liao et al. |
| 2019/0250006 A1 | 8/2019 | Lu et al. |
| 2019/0266890 A1 | 8/2019 | Lei et al. |
| 2019/0360821 A1 | 11/2019 | Schertz et al. |
| 2020/0064147 A1 | 2/2020 | Sliney |
| 2020/0116518 A1* | 4/2020 | Lee ...................... G01C 21/365 |
| 2020/0219325 A1 | 7/2020 | Seo et al. |
| 2021/0003414 A1 | 1/2021 | Yamaguchi et al. |

OTHER PUBLICATIONS

Office Action for U.S. Appl. No. 17/002,489 dated Dec. 6, 2022, 13 pages.

Y. Park, "The Genesis GV80, equipped with advance IT such as an augmented reality navigation system, handwriting-recognition function, and simple payment etc.", www.ebn.co.kr/news/prints/1008255 (Nov. 7, 2019).

NAVER Cafe, "The mode setting of the Genesis GV 80 navigation includes the neon view mode", Genesis GV80 Club Main Cafe, (Feb. 6, 2020).

* cited by examiner

<801> <802>

<901> <902>

DISPLAY APPARATUS FOR VEHICLE AND METHOD THEREOF

CROSS-REFERENCE TO RELATED APPLICATION

This application claims under 35 U.S.C. § 119(a) the benefit of Korean Patent Application No. 10-2020-0048168, filed in the Korean Intellectual Property Office on Apr. 21, 2020, the entire contents of which are incorporated herein by reference.

BACKGROUND

(a) Technical Field

The present disclosure relates to a display apparatus for a vehicle and a method thereof, more particularly, to a technique capable of improving visibility by displaying vehicle information based on a neon view.

(b) Description of the Related Art

A vehicle navigation provides map information, as shown in FIG. 1 (RELATED ART), for location search and path guidance.

The location search includes location information for searching for a destination or a waypoint during a stop, and the path guidance includes direction information for reaching a destination while driving.

To this end, the vehicle navigation outputs various information such as a location of a host vehicle (a host vehicle mark), a direction, a cycle (an icon and a name indicating a type), type and color classification by category, buildings and structures, topographical indications such as green/water/altitude, road shapes, and names on a screen.

As described above, when providing map information, all information is simultaneously displayed without distinction of each use, there is a problem that visibility and usability may be deteriorated due to excess information being displayed in a limited space.

Accordingly, in the related art, a lot of information is redundantly provided, and particularly in a 3D view, a driver may not be able to recognize important information in a timely manner while driving, due to an increase in complexity.

The above information disclosed in this Background section is only for enhancement of understanding of the background of the disclosure, and therefore it may contain information that does not form the prior art that is already known in this country to a person of ordinary skill in the art.

SUMMARY

An exemplary embodiment of the present disclosure provides a display apparatus for a vehicle and a method thereof, capable of improving visibility of vehicle information and concentration of a driver by minimizing an amount of complicated information such as text or points of interest (POI) of vehicle information, while providing only information necessary for the driver based on a neon view.

An exemplary embodiment of the present disclosure provides a display apparatus for a vehicle, including: a controller configured to create a 3D map based on a neon view by selecting essential information among map information; and a display device configured to display the 3D map based on the neon view created by the controller, the controller displays a structure on a background screen of the map information by using a shadow or displays the structure on a dark background screen by using an outline of the structure when the 3D map based on the neon view is created.

In an exemplary embodiment, the essential information may include at least one of current location information of a host vehicle, path information, time information, destination information, distance information remaining to a destination, or current time information.

In an exemplary embodiment, the controller may differentially set transparency of the structure on the 3D map by structural features or distance.

In an exemplary embodiment, the controller may create the 3D map by reducing transparency of buildings when the buildings are overlapped and displayed in the structure.

In an exemplary embodiment, the controller may create the 3D map by reducing transparency of a building when the building and a path are overlapped and displayed in the structure.

In an exemplary embodiment, the controller may create the 3D map by increasing transparency of the structure as a distance from a host vehicle to the structure is smaller.

In an exemplary embodiment, the controller may set at least one of a color, an edge, or a gradient effect of the structure on the 3D map.

In an exemplary embodiment, the controller, for a color of the structure, may differently set colors of a wall surface and a roof surface of a building when the structure is the building.

In an exemplary embodiment, the controller, for an edge of the structure, may set at least one of transparency, a thickness, and a color of an outer line of the structure.

In an exemplary embodiment, the controller, for a gradient effect of the structure, may apply the gradient effect to a wall surface of a building when the structure is the building.

In an exemplary embodiment, the controller may include a light source based on a host vehicle on the 3D map.

In an exemplary embodiment, the controller may dim or blur a surrounding area except a central area where a path on the 3D map is displayed.

In an exemplary embodiment, the controller may translucently process a path line among essential information, may separately transparently process a portion of the path line, or may process the path line to be displayed in duplicate.

In an exemplary embodiment, the controller may perform shadow processing on a mark representing a host vehicle on the 3D map.

In an exemplary embodiment, the controller may display a color of a fog area at an end portion of a horizon on the 3D map by applying an inverted color to a background color of the 3D map.

In an exemplary embodiment, the controller may form a host vehicle mark displayed on the 3D map to have a structure that is inclined in a predetermined direction.

In an exemplary embodiment, the controller, when providing detailed information of a rotation guidance point on the 3D map, may start to provide a map based on an auto view mode by reducing a scale of the 3D map based on the neon view and changing a viewing angle of the 3D map to a predetermined value when the host vehicle reaches a rotation guidance time point.

In an exemplary embodiment, the controller may gradually increase a scale of the map based on an auto view mode and a viewing angle of the map from a time point at which the host vehicle starts the auto view mode to a time point at which it reaches a rotation point.

In an exemplary embodiment, the controller may release the auto view within a predetermined time, and may restore the scale and the viewing angle of the map when the host vehicle passes through the rotation point.

In an exemplary embodiment, the controller may display a rotation direction on a path line of the rotation point.

In an exemplary embodiment, the controller may display a name of a travel direction and remaining distance information on a region that is close to the rotation point on the map based on the auto view mode.

An exemplary embodiment of the present disclosure provides a display method for a vehicle, including: selecting essential information among map information; creating a 3D map based on a neon view to display the essential information thereon; and display the 3D map.

The above-described technique may express information to a driver simply and intuitively and display it in a timely manner by minimizing the amount of complex information such as text or POI of vehicle information and guiding only the information necessary for the driver based on a neon view, so as to increase visibility of vehicle information and concentration of the driver.

DETAILED DESCRIPTION OF THE EMBODIMENTS

Figure 1:
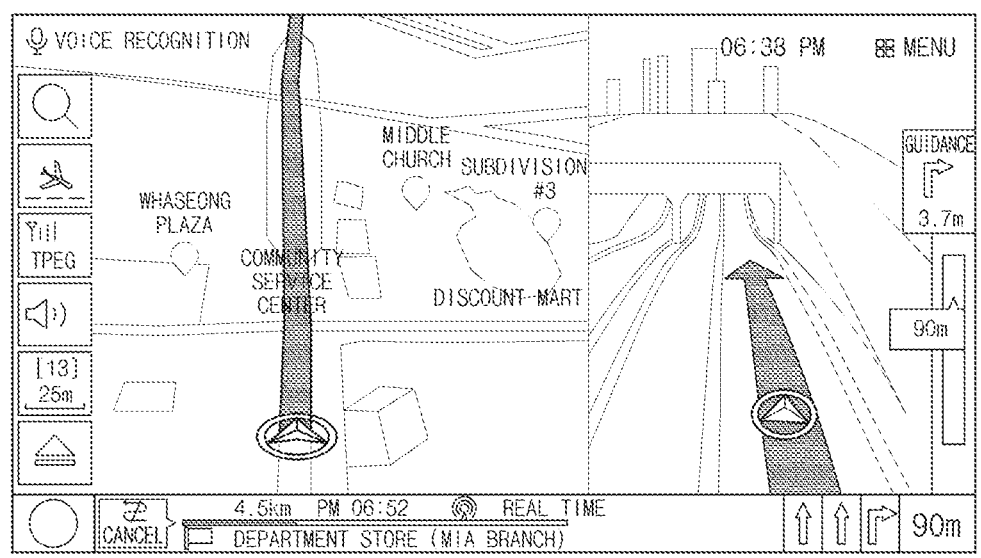
FIG. 1 (RELATED ART) illustrates an example of a screen displayed in a vehicle.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. In addition, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

The present disclosure discloses a technique capable of minimizing an amount of complex information such as text or points of interest (POI) by deleting unnecessary information and displaying only necessary information based on a neon view when the information is provided through a display apparatus for a vehicle, to maximize visibility.

Hereinafter, exemplary embodiments of the present disclosure will be described in detail with reference to FIGS. 2 to 19.

Figure 2:
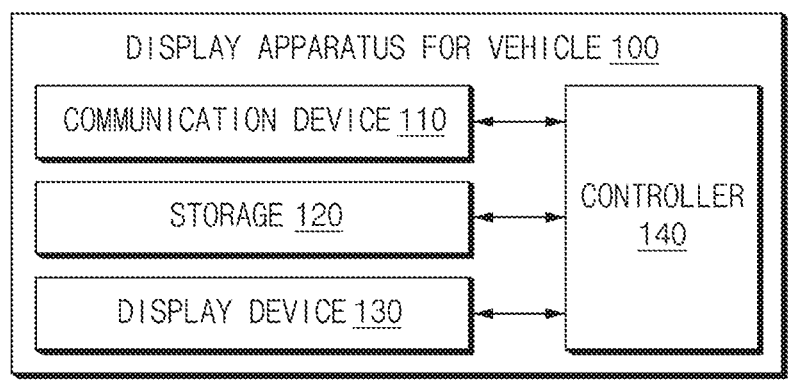
FIG. 2 illustrates a block diagram showing a configuration of a display apparatus for a vehicle according to an exemplary embodiment of the present disclosure.

FIG. 2 illustrates a block diagram showing a configuration of a display apparatus for a vehicle according to an exemplary embodiment of the present disclosure.

Referring to FIG. 2, according to an exemplary embodiment of the present disclosure, the display apparatus 100 for the vehicle may be implemented inside the vehicle. In this case, the display apparatus 100 may be integrally formed with internal control units of the vehicle, or may be implemented as a separate device to be connected to control units of the vehicle by a separate connection arrangement.

The display apparatus 100 may create and display a view of a map based on a neon view by deleting unnecessary information (text, POI, etc.) from map information and selecting only certain information that is deemed "essential" to a driver while driving.

In this case, the neon view may include neon white and neon black, where neon white is a method of displaying a map in shades of buildings and terrain on a light background, and neon black is a method of displaying buildings and terrain on a dark background by using outlines.

To this end, the display apparatus 100 may include a communication device 110, a storage 120, a display device 130, and a controller 140.

The communication device 110, which is a hardware device implemented with various electronic circuits to transmit and receive signals through a wireless or wired connection, may perform V2I communication by using an in-vehicle network communication technique or a wireless Internet access or short range communication technique with servers, infrastructure, and other vehicles outside the vehicle in the present disclosure. Herein, in-vehicle communication may be performed through controller area network (CAN) communication, local interconnect network (LIN) communication, or flex-ray communication as the in-vehicle network communication technique. In addition, the wireless communication technique may include wireless LAN (WLAN), wireless broadband (Wibro), Wi-Fi, world Interoperability for microwave access (Wimax), etc. In addition, short-range communication technique may include bluetooth, ZigBee, ultra wideband (UWB), radio frequency identification (RFID), infrared data association (IrDA), and the like.

As an example, the communication device 110 may transmit or receive information related to surrounding conditions of a driving road, e.g., traffic accidents, road construction, traffic congestion, and the like with respect to surrounding vehicles or surrounding infrastructure. Subsequently, the controller 140 may reflect information related to the surrounding conditions of the driving road, received from the communication device 110 on a 3D map based on a neon view.

As an example, the storage 120 may store map information, and the like for providing a path. In addition, the storage 120 may store information such as a driving situation and a traffic situation received through V2X communication. The storage 120 may also store instructions and/or algorithms for generating map information based on the neon view by the controller 140.

The storage 120 may include a storage medium of at least one type among memories of types such as a flash memory, a hard disk, a micro, a card (e.g., an secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The display device 130 may include a display, and may also include a voice output mechanism such as a speaker.

As an example, the display device 130 may display a driving situation, map information, path information, and the like, and may display map information based on the neon view.

In this case, when a touch sensor formed of a touch film, a touch sheet, or a touch pad is provided on the display, the display may operate as a touch screen, and may be implemented in a form in which an input device and an output device are integrated.

In this case, the display may include at least one of a liquid crystal display (LCD), a thin film transistor liquid crystal display (TFT LCD), an organic light emitting diode display (OLED display), a flexible display, a field emission display (FED), and a 3D display.

The display device 130 may be implemented as a head-up display (HUD), a cluster, an audio video navigation (AVN), or a human machine interface (HMI). In addition, the display device 130 may include at least one of a liquid crystal display (LCD), a thin film transistor liquid crystal display (TFT LCD or thin film transistor-LCD), a light emitting diode (LED) display, an organic light emitting diode (OLED or organic LED) display, an active OLED (AMOLED or active matrix OLED) display, a flexible display, a bended display, and a 3D display. Some of these displays may be implemented as transparent displays formed of a transparent or translucent type such that the outside can be viewed. In addition, the display device 130 may be provided as a touch screen including a touch panel, and may be used as an input device as well as an output device.

In this case, the display device 130 may include an input device for receiving a control instruction from a user, and the input device may include a key button, and may also include a mouse, a joystick, a jog shuttle, a stylus pen, or the like. In addition, the input device 250 may include a soft key implemented on the display.

The processor 140 may be electrically connected to the communication device 110, the storage 120, the display device 130, and the like, may electrically control each component, and may be an electrical circuit that executes software commands, thereby performing various data processing and calculations described below. The controller 140 may be, e.g., an electronic control unit (ECU), a micro controller unit (MCU), or other subcontrollers mounted in the vehicle.

Figure 3:
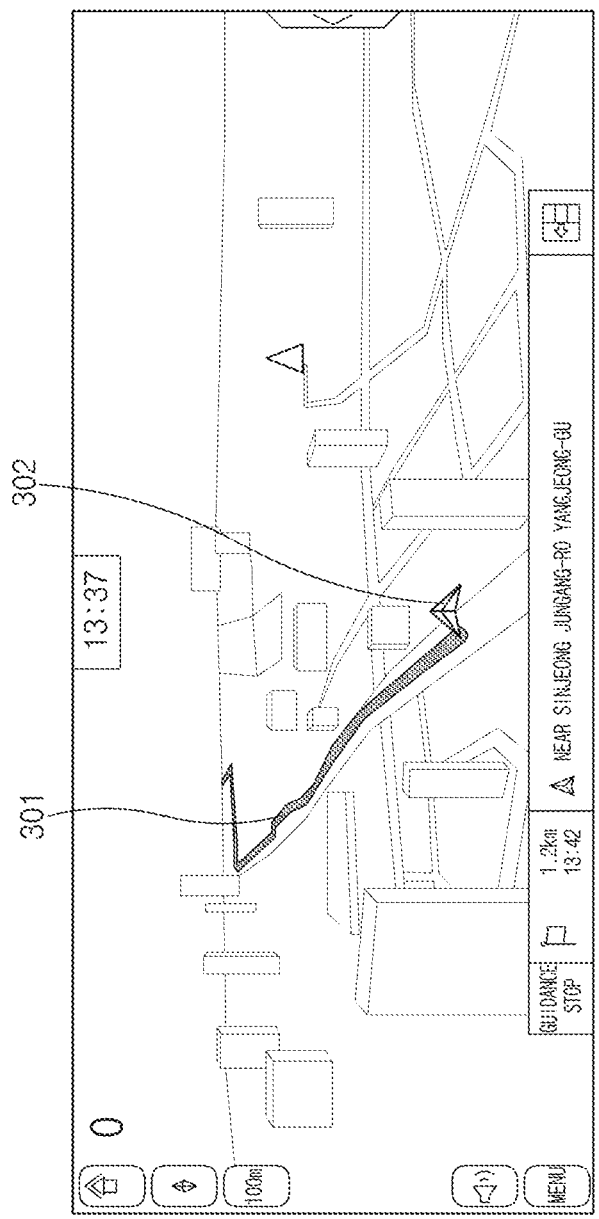
FIG. 3 illustrates an example of a screen of map information based on a neon view white according to an exemplary embodiment of the present disclosure.
Figure 4:
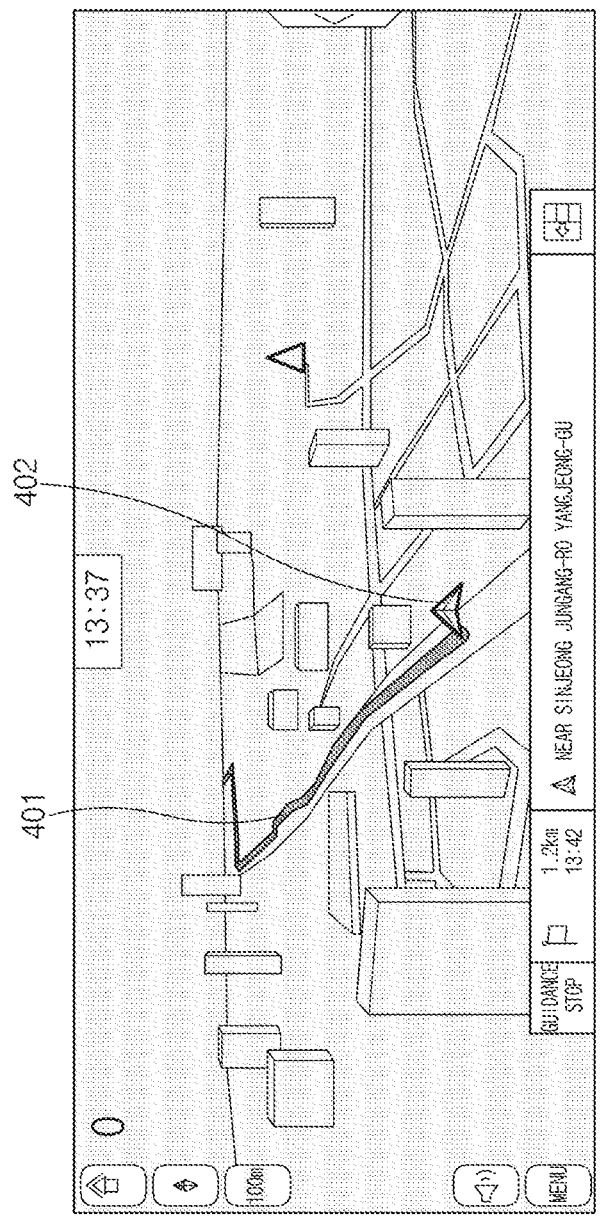
FIG. 4 illustrates an example of a screen of map information based on a neon view black according to an exemplary embodiment of the present disclosure.

The controller 140 selects essential information from the map information and creates a 3D map based on the neon view. In this case, when the 3D map based on the neon view is created, the controller 140 may display a structure on a background screen of the map information by using a shadow as illustrated in FIG. 3, or may display the structure on a dark background screen by using outlines of the structure as illustrated in FIG. 4. FIG. 3 illustrates an exemplary screen of map information based on a neon view white according to an exemplary embodiment of the present disclosure, and FIG. 4 illustrates an example of a screen of map information based on a neon view black according to an exemplary embodiment of the present disclosure. In FIG. 3 and FIG. 4, the surrounding information is minimized and displayed such that a location of a host vehicle 302 and 402 and a path line 301 and 401, which is essential information on the surrounding background, are visible at a glance. In this case, the essential information may include at least one of current location information of a host vehicle, path information, time information, destination information, distance information remaining to the destination, or current time information.

The controller 140 may differentially set transparency of the structure among essential information on the 3D map by structural features or distance.

For example, when buildings are overlapped and displayed in the structure, the controller 140 may create the 3D map by reducing the transparency of the buildings. That is, when the buildings are overlapped, the controller 140 may reduce screen complexity and provide a 3D effect by applying no transparent process.

When a building and a path are overlapped and displayed in the structure, the controller 140 may create the 3D map by increasing the transparency of the building, thereby securing visibility of the path.

Figure 5:
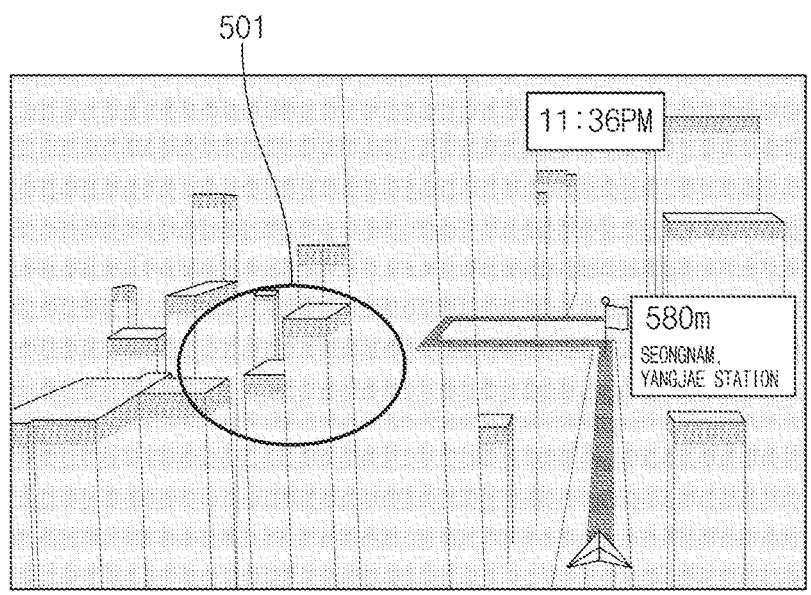
FIG. 5 illustrates an example of a screen for setting transparency in map information based on a neon view according to an exemplary embodiment of the present disclosure.

In addition, the closer the distance from the host vehicle to the structure, the control unit 140 may increase the transparency of the structure and may decrease the transparency of the structure at a long distance to increase perspective and 3D effects. FIG. 5 illustrates an example of a screen for setting transparency in map information based on a neon view according to an exemplary embodiment of the present disclosure. As illustrated in FIG. 5, the transparency of overlapped buildings may be differentially applied.

The controller 140 may set at least one of a color, an edge, or a gradient effect of a structure on the 3D map. That is, when the structure is a building, the controller 140 may differently set colors of a wall surface and a roof surface of the building to display it.

Figure 6:
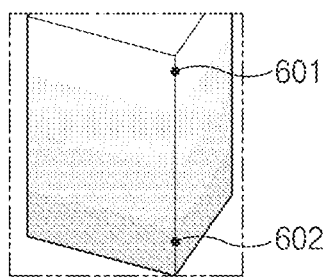
FIG. 6 illustrates an example of a screen for displaying an edge of a structure in map information based on a neon view according to an exemplary embodiment of the present disclosure.

In addition, the controller 140 may set at least one of transparency, a thickness, and a color of an outer line of the structure to increase a 3D effect and to minimize complexity. Transparency, thicknesses, and colors of an upper edge 601 of the building and a lower edge 602 of the building may be differently set. FIG. 6 illustrates an example of a screen for displaying an edge of a structure in map information based on a neon view according to an exemplary embodiment of the present disclosure.

Figure 7:
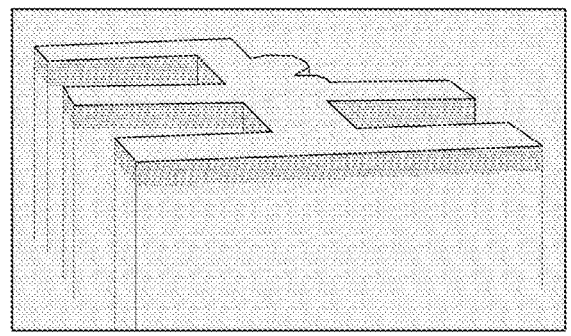
FIG. 7 illustrates an example of a screen for displaying a gradient effect of a structure in map information based on a neon view according to an exemplary embodiment of the present disclosure.

In addition, when the structure is a building, the controller 140 may increase the 3D effect by applying a gradient effect to the wall surface of the building, and may provide the gradient effect by making an upper portion of the building wall lighter and a lower portion thereof darker. FIG. 7 illustrates an example of a screen for displaying a gradient effect of a structure in map information based on a neon view according to an exemplary embodiment of the present disclosure.

Figure 8:
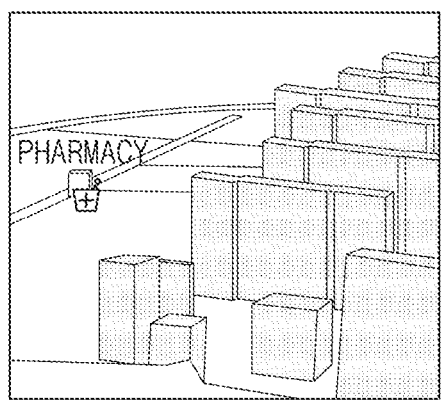
FIG. 8 illustrates an example of a screen for setting a light source around a host vehicle in map information based on a neon view according to an exemplary embodiment of the present disclosure.
Figure 8:
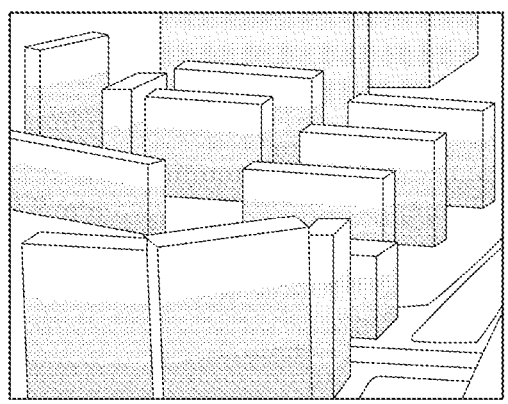

The controller 140 may set a light source based on the host vehicle on the 3D map. FIG. 8 illustrates an example of a screen for setting a light source around a host vehicle in map information based on a neon view according to an exemplary embodiment of the present disclosure. When the map is rotated and displayed based on a fixed light source, a dark surface may occur, and particularly, in the case of counter light as shown in a screen 801 of FIG. 8, it may be difficult to recognize a building, and a design intention may not be well represented. Accordingly, in the present disclosure, as shown in a screen 802 of FIG. 8, it is possible to optimize the perception and visibility of 3D impression of a building shape by setting the light source based on the host vehicle.

Figure 9:
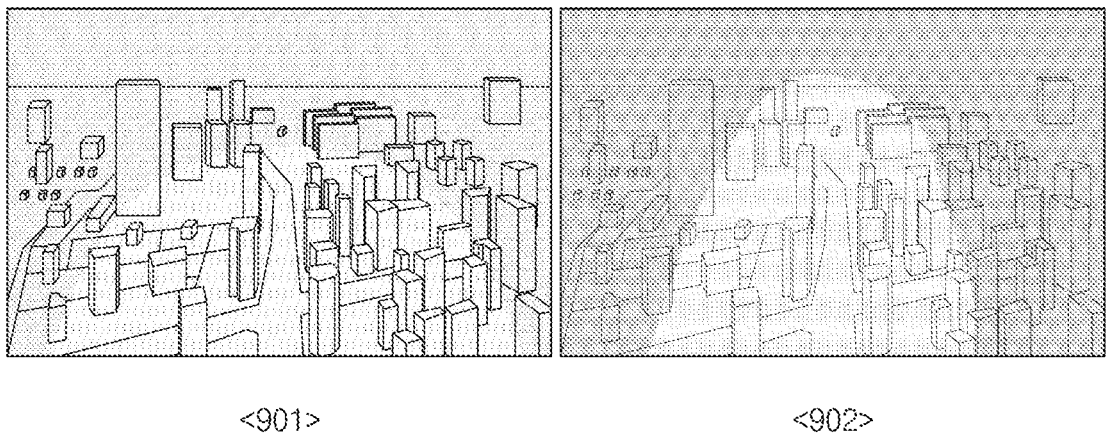
FIG. 9 illustrates an example of a screen for setting concentration on essential information in map information based on a neon view according to an exemplary embodiment of the present disclosure.

The controller 140 may dim or blur a surrounding area except a central area where a path on the 3D map is displayed. FIG. 9 illustrates an example of a screen for setting concentration on essential information in map information based on a neon view according to an exemplary embodiment of the present disclosure, a screen 901 of FIG. 9 shows an example in which it is dimmed, and a screen 902 shows an example in which it is blurred. As illustrated in FIG. 9, concentration of the central area (e.g., a central area of the screen or an area where the path is displayed) may be secured by faintly or darkly processing the surrounding area, thereby maximizing visibility of the central area.

Figure 10:
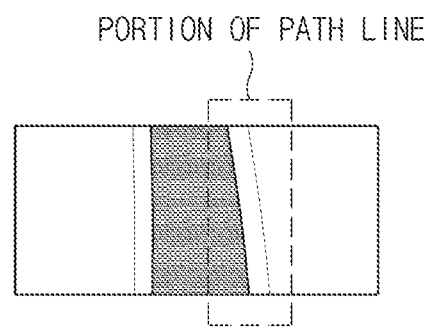
FIG. 10 illustrates an example of a screen for applying texture transparency in map information based on a neon view according to an exemplary embodiment of the present disclosure.

The controller 140 may translucently process a path line among essential information, may separately transparently process a portion of the path line, or process the path line to be displayed in duplicate. FIG. 10 illustrates an example of a screen for applying texture transparency in map information based on a neon view according to an exemplary embodiment of the present disclosure. In FIG. 10, an example in which transparency is further increased on opposite outer lines of the path line is illustrated as an example in which separate transparency is applied only to a portion of the path line.

Figure 11:
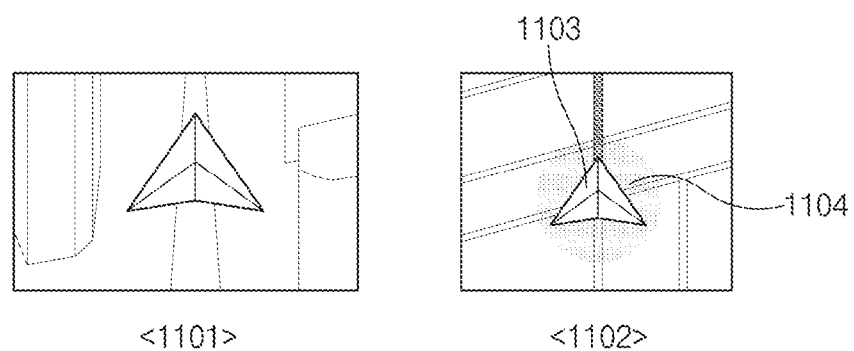
FIG. 11 illustrates an example of a screen for setting a shadow of a host vehicle in map information based on a neon view according to an exemplary embodiment of the present disclosure.

The controller 140 may perform shadow processing on a mark representing a host vehicle on the 3D map. FIG. 11 illustrates an example of a screen for setting a shadow of a host vehicle in map information based on a neon view according to an exemplary embodiment of the present disclosure.

As illustrated in FIG. 11, a circular light source surrounding a host vehicle 1103 may be displayed at a lower end of a host vehicle mark, and a shadow 1104 for highlighting the host vehicle mark may be processed to emphasize the host vehicle mark such that a driver can intuitively recognize a location of the host vehicle at a glance.

Figure 12A:
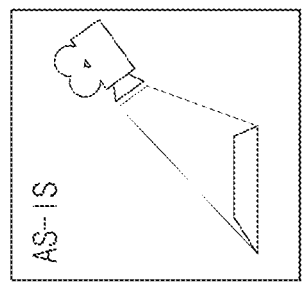
FIG. 12A and FIG. 12B illustrate an example of a screen for setting a view area range in map information based on a neon view according to an exemplary embodiment of the present disclosure.
Figure 12A:
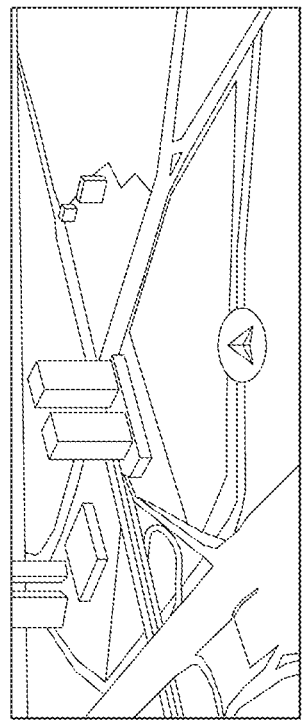
Figure 12B:
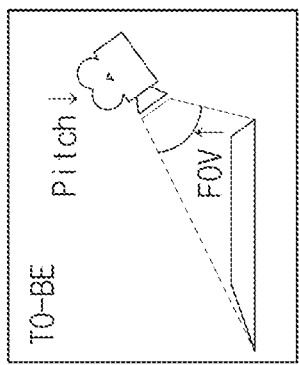
Figure 12B:
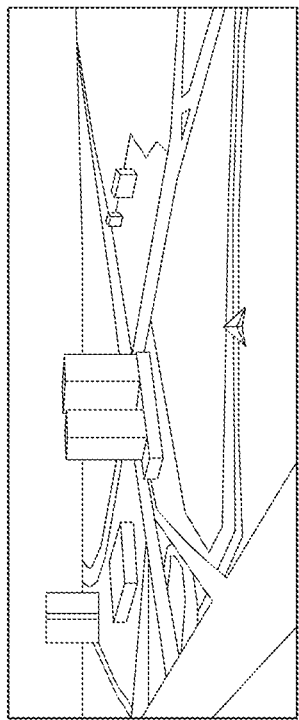

The controller 140 may set a range and angle of the view area on the 3D map. FIG. 12A and FIG. 12B illustrate an example of a screen for setting a view area range in map information based on a neon view according to an exemplary embodiment of the present disclosure. Screens 1201 and 1202 of FIG. 12A show a conventional view area range, and screens 1203 and 1204 of FIG. 12B show views according to a conventional field of view (FOV) and a viewing angle setting. The screen 1203 represents a predetermined view area range and viewing angle in the present disclosure, and the screen 1204 represents a view according thereto. In addition, it is possible to set the viewing angle for each reference scale, and Table 1 below shows an example of the predetermined viewing area range and viewing angle.

TABLE 1

| View area range | Viewing angle (pitch) |
| --- | --- |
| 11 | −52.25 |
| 12 | −25 |
| 13 | −18 |
| 14 | −18 |
| 15 | −11 |
| 16-19 | −19 |

Figure 13A:
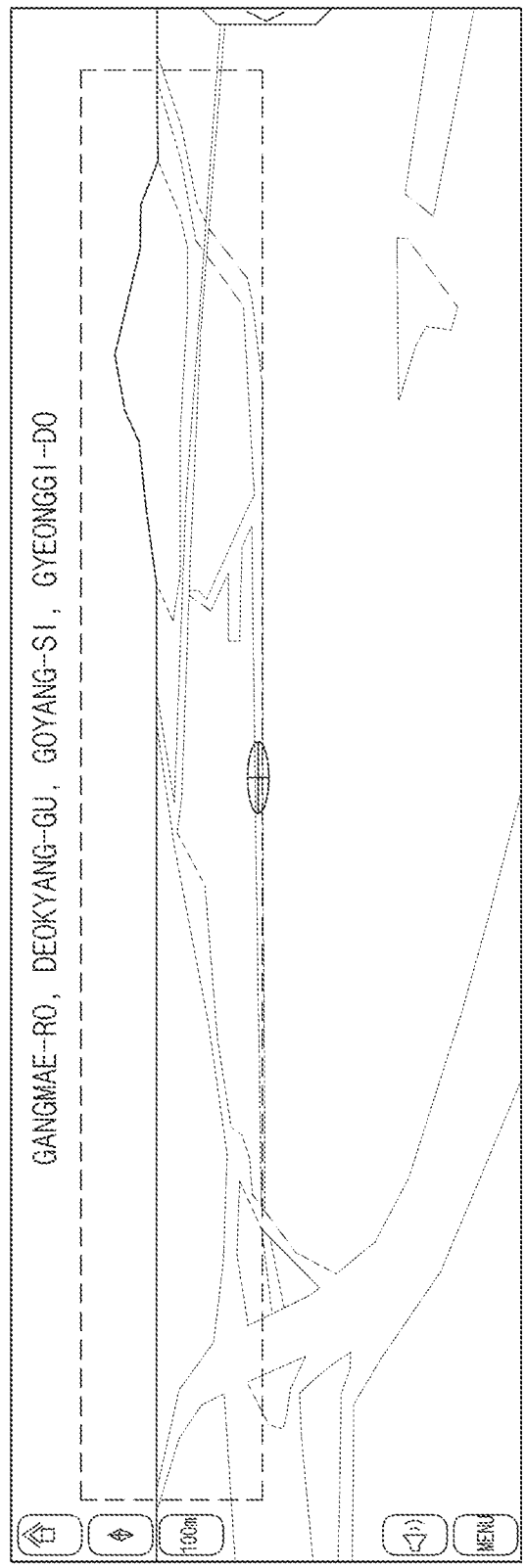
FIG. 13A and FIG. 13B illustrate an example of a screen for setting a laser scanning fog effect in map information based on a neon view according to an exemplary embodiment of the present disclosure.
Figure 13B:
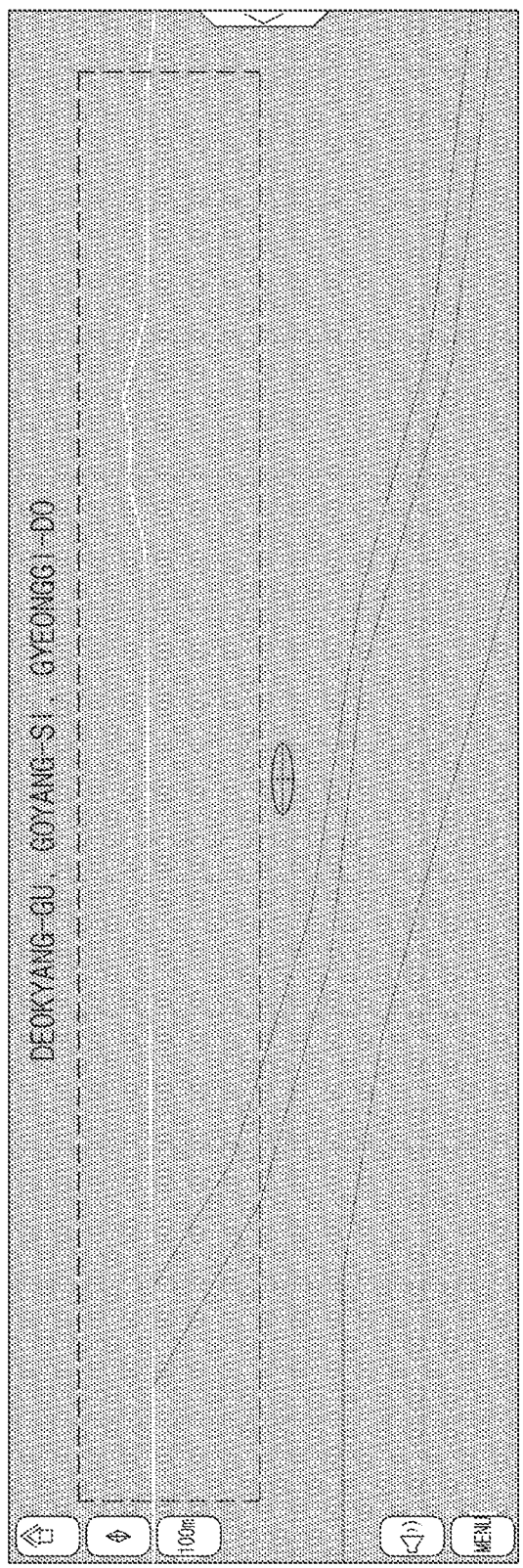

The controller 140 may display a color of a fog area at an end portion of a horizon on the 3D map by applying an inverted color to a background color of the 3D map. FIG. 13A and FIG. 13B illustrate an example of a screen for setting a laser scanning fog effect in map information based on a neon view according to an exemplary embodiment of the present disclosure. FIG. 13A illustrates an example of applying the laser scanning fog effect on the 3D map based on the neon white, FIG. 13B illustrates an example of applying the laser scanning fog effect on the 3D map based on the neon black, and this application of the laser scanning fog effect may increase an aesthetic effect of the 3D map.

Figure 14A:
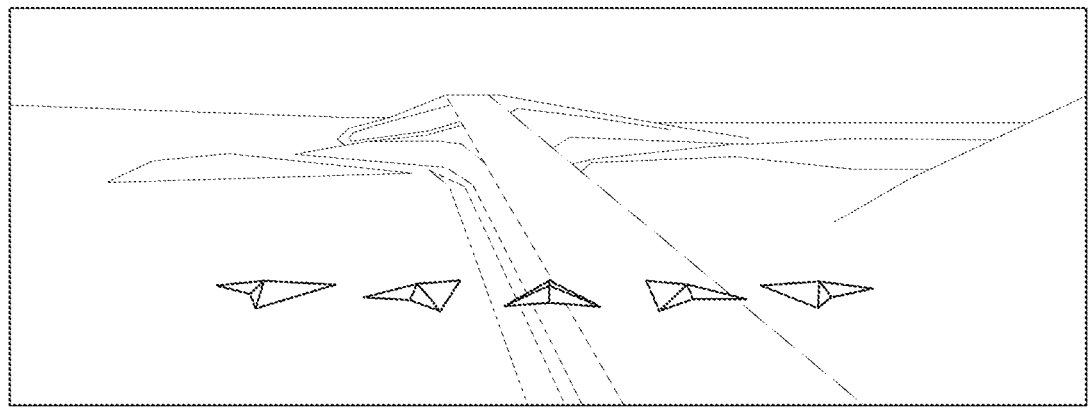
FIG. 14A and FIG. 14B illustrate an example of a screen for setting a display of a host vehicle mark in map information based on a neon view according to an exemplary embodiment of the present disclosure.
Figure 14B:
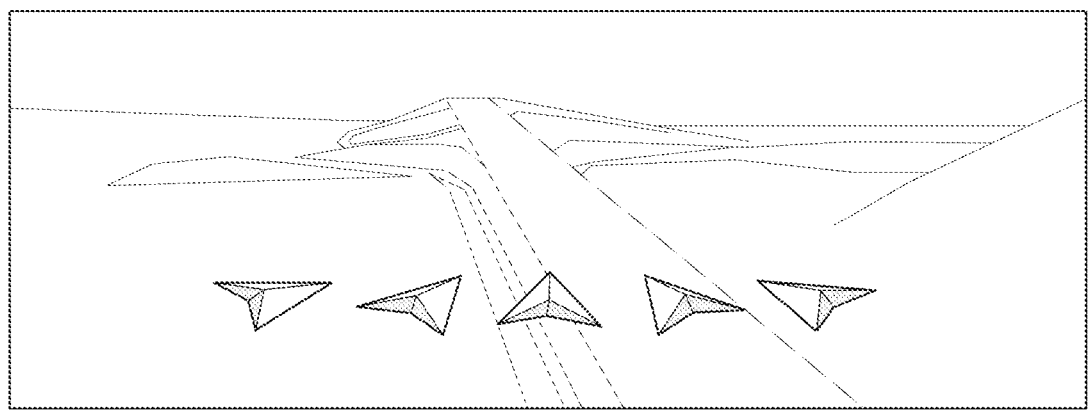

The controller 140 may form a host vehicle mark displayed on the 3D map to have a structure that is inclined in a predetermined direction. FIG. 14A and FIG. 14B illustrate an example of a screen for setting a display of a host vehicle mark in map information based on a neon view according to an exemplary embodiment of the present disclosure. FIG. 14A illustrates an example of displaying a conventional host vehicle, and the display of the host vehicle may not be visible depending on a driving direction of the host vehicle and a position of a camera. As illustrated in FIG. 14B, it is possible to optimally display the host vehicle mark regardless of the driving direction of the host vehicle and the position of the camera.

Figure 15:
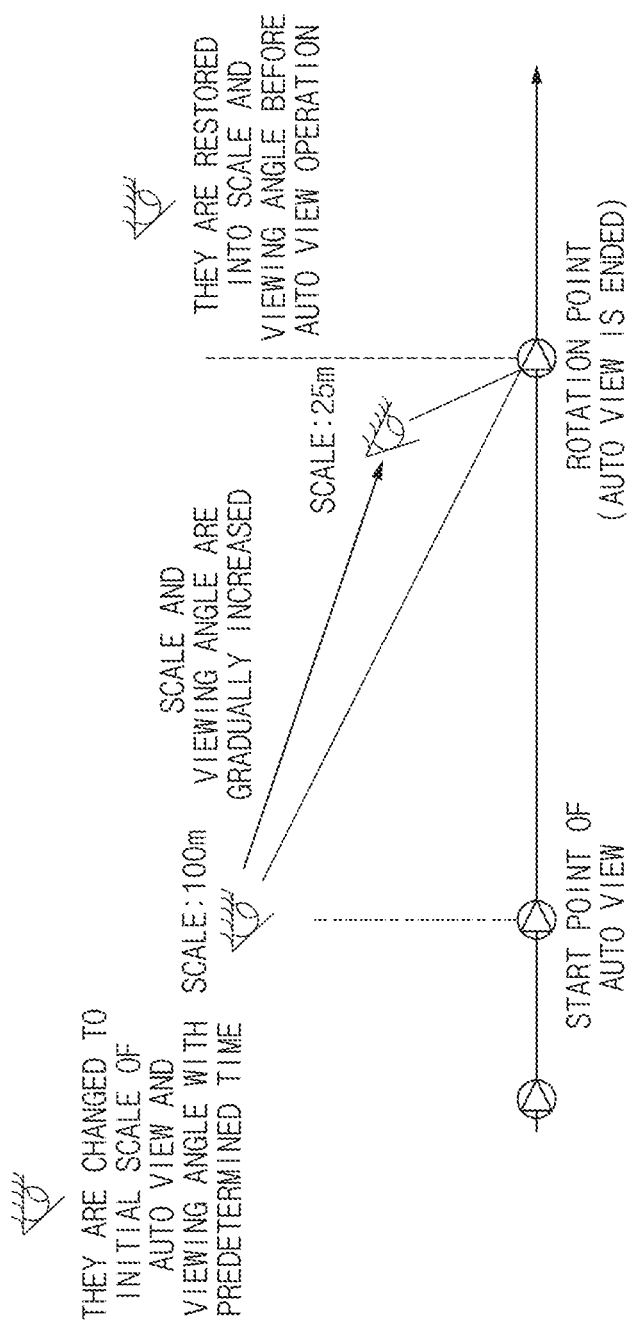
FIG. 15 illustrates a view for describing an operation of providing map information based on an auto view according to an exemplary embodiment of the present disclosure.

FIG. 15 illustrates a view for describing an operation of providing map information based on an auto view according to an exemplary embodiment of the present disclosure. Referring to FIG. 15, the controller unit 140 may recognize a road type to determine a rotation guidance time point when detailed information of a rotation guidance point is provided on the 3D map and when path information among essential information is provided. In addition, when the host vehicle reaches the rotation guidance time point, the controller 140 may start to provide a map based on an auto view mode by reducing a scale of the 3D map based on the neon view and changing a viewing angle of the 3D map to a predetermined value. In addition, the controller 140 may gradually increase the scale of the map based on the auto view mode and the viewing angle of the map from a time point at which the host vehicle starts the auto view mode to a time point at which it reaches the rotation point.

When the host vehicle passes through the rotation point, the controller 140 may release the auto view mode within a predetermined time, may restore the scale of the map and the viewing angle of the map, and may display the previously displayed 3D map based on the neon view.

Figure 16:
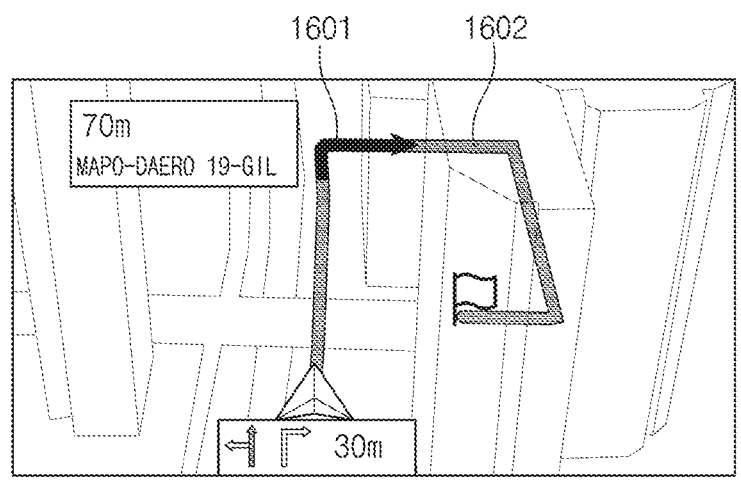
FIG. 16 illustrates an example of a screen for displaying vehicle information based on an auto view for guiding a direction based on a neon view white according to an exemplary embodiment of the present disclosure.
Figure 17:
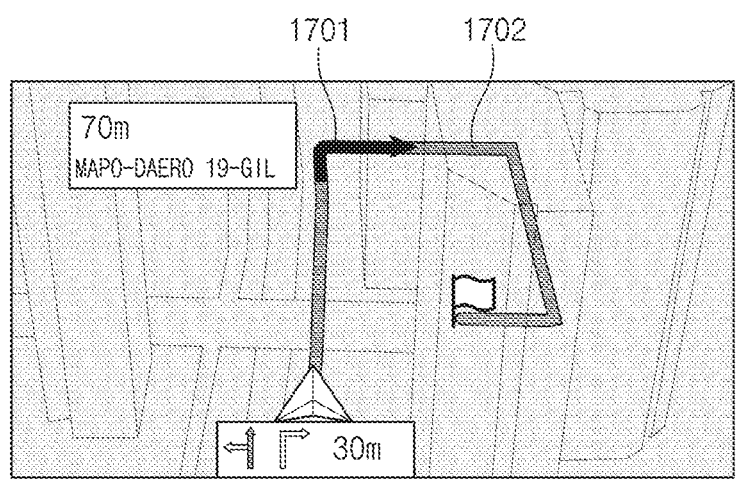
FIG. 17 illustrates an example of a screen for displaying vehicle information based on an auto view for guiding a direction based on a neon view black according to an exemplary embodiment of the present disclosure.

The controller 140 may display a rotation direction on the path line of the rotation point on the map based on the auto view mode, and may display a name of a travel direction and remaining distance information on a region that is close to the rotation point on the map based on the auto view mode. FIG. 16 illustrates an example of a screen for displaying vehicle information based on an auto view for guiding a direction based on a neon view white according to an exemplary embodiment of the present disclosure, and FIG. 17 illustrates an example of a screen for displaying vehicle information based on an auto view for guiding a direction based on a neon view black according to an exemplary embodiment of the present disclosure. The display apparatus 100 may provide a more accurate direction guidance by displaying rotation directions 1601 and 1701 on path lines 1602 and 1702 of the rotation point. In addition, the display apparatus 100 may intuitively transfer a clear guided point by displaying the name of the travel direction of and the remaining distance information next to a turn point on the map.

According to the present disclosure, it is possible to provide an aesthetically more advanced 3D map together with optimization of an amount of information by distinguishing path information and essential information for driving and efficiently providing the information, and it is possible to appropriately display necessary information from a new perspective to increase user convenience with a simple and stylish design of the neon view as compared to a conventional map information display by providing detailed information of the path based on the auto view mode.

Figure 18:
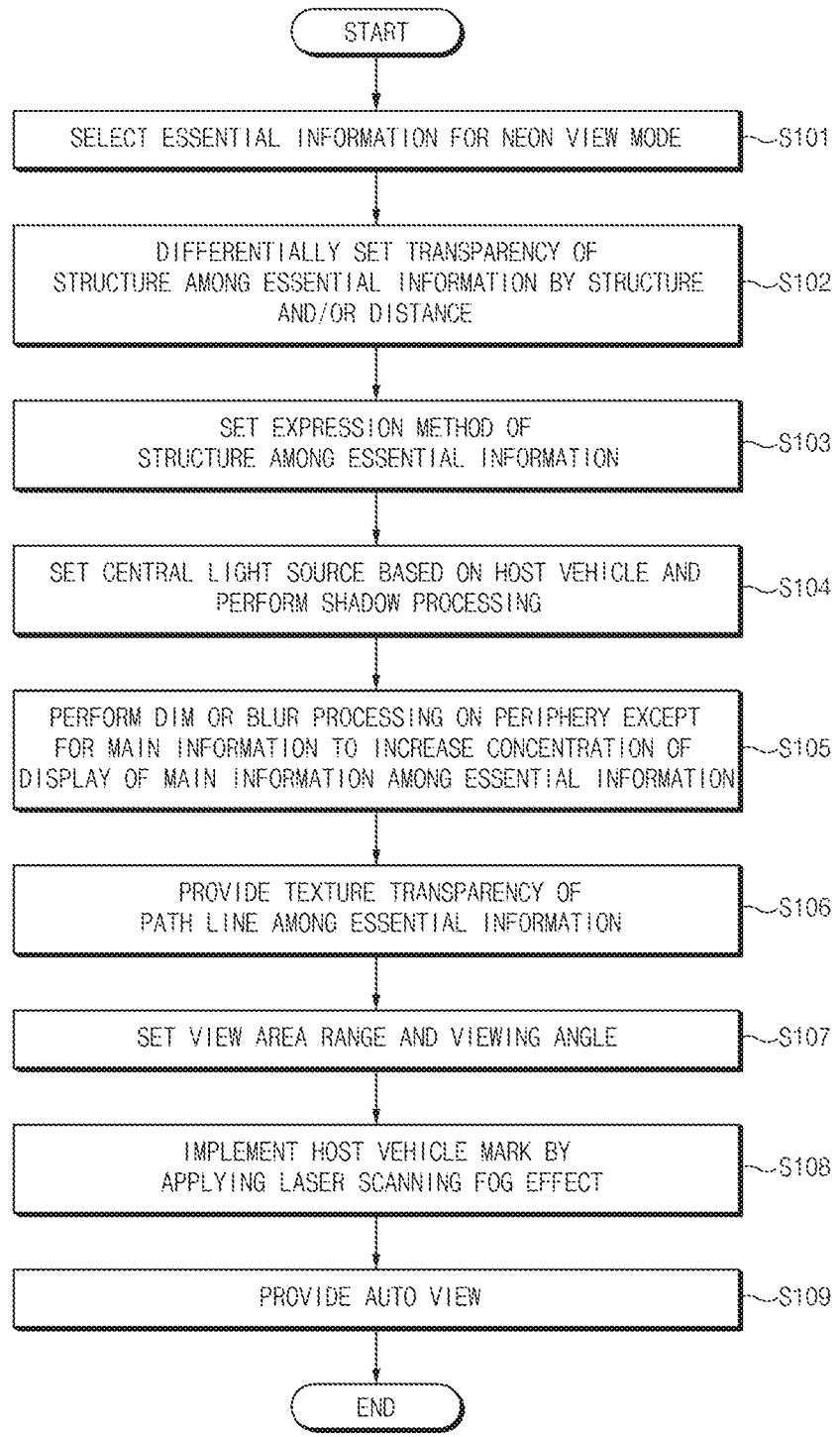
FIG. 18 illustrates a flowchart for describing a method for displaying vehicle information based on a neon view according to an exemplary embodiment of the present disclosure.

Hereinafter, a method for displaying vehicle information based on a neon view according to an exemplary embodiment of the present disclosure will be described in detail with reference to FIG. 18. FIG. 18 illustrates a flowchart for describing a method for displaying vehicle information based on a neon view according to an exemplary embodiment of the present disclosure.

Hereinafter, it is assumed that the display apparatus 100 of the vehicle of FIG. 1 performs a process of FIG. 18. In addition, in the description of FIG. 18, operations described as being performed by a device may be understood as being controlled by the controller 140 of the display apparatus 100.

Referring to FIG. 18, the display apparatus 100 selects essential information for a neon view mode (S101).

In this case, the essential information for the neon view mode is information that is necessary for recognizing a driving situation and a traffic situation. For example, it may include a building, a road, a destination, a current location, time information, remaining distance information, and the like. In this way, in the neon view mode, unnecessary information (e.g., POI, text, etc.) may be excluded, and only the essential information may be displayed to improve visibility.

The display apparatus 100 may increase visibility by changing a display position and a display method of essential information.

The display apparatus 100 may differentially set transparency of the structure among the essential information by structural features and/or distance (S102). The display apparatus 100 may set the transparency of the building itself to visually optimize an information throughput, and may perform separate transparency processing for each object in order to increase visibility.

In addition, when the buildings are overlapped, the display apparatus 100 may reduce screen complexity and provide a 3D effect by applying no transparent process. In addition, when a building and a road overlap each other, the display apparatus 100 may secure visibility by applying a transparent process. In addition, when transparency of a building is differently applied depending on a distance, the display apparatus 100 may more transparently display the building as it is closer, to provide perspective and 3D effects.

Next, the display apparatus 100 may set an expression method of the structure among essential information (S103). That is, the display apparatus 100 may express the structure by applying a color, an edge, or a gradient effect of the structure. In this case, the display apparatus 100 may differently set colors of a wall surface and a roof surface of the building as shown in a region 501 of FIG. 5, and may variously apply at least one setting of transparency, a thickness, and a color of an outer line (edge) of the building. In this case, when an edge of the structure is not in contact with a ground in the map information based on the neon view block, there may be overlapping in a region at which buildings are densely located, which may lead to less sense of division and increased complexity, and thus at least one setting of transparency, a thickness, and a color of an outer line (edge) of the building may be variously applied. In addition, as illustrated in FIG. 7, the display apparatus 100 may apply the gradient effect to a wall surface of the structure to make the 3D effect richer.

The display apparatus 100 may set a light source around a host vehicle in the map information based on the neon view, and may perform shadow processing on the host vehicle (S104). As shown in a shadow 1102 of FIG. 11, a shadow may be set at a lower end of the host vehicle.

The display apparatus 100 may perform dim processing or blur processing on the periphery except for main information in order to increase concentration of display of the main information among the essential information (S105). The display apparatus 100 may set texture transparency of the path line among the essential information (S106). FIG. 9 illustrates an example in which concentration of the main information is increased by blurring a periphery of the main information, and FIG. 10 illustrates an example in which separate transparency is applied to a portion of the path line. In addition, the display apparatus 100 may display the path line as translucent, may separately apply transparency of a portion of the path line, or display the path line in a double way.

The display apparatus 100 may set the view area range and angle in the map information based on the neon view (S107). FIG. 12A and FIG. 12B illustrate an example in which the view area range and angle (pitch) are optimized to a predetermined value.

The display apparatus 100 may implement the host vehicle mark by applying a laser scanning fog effect (S108). As illustrated in FIG. 14B, the host vehicle mark may be implemented such that a front portion of the host vehicle is inclined toward the camera. That is, as shown in FIG. 13A and FIG. 13B, the display apparatus 100 may provide an effect of showing that terrain and buildings appear or disappear as if scanning the terrain and buildings by using a laser scanner by applying a color that is inverted to a map color to a color of a fog area at an end portion of the horizon.

The display apparatus 100 may display the map information based on the neon view as an auto view in order to compensate a reduction in the amount of information (S109).

Figure 19:
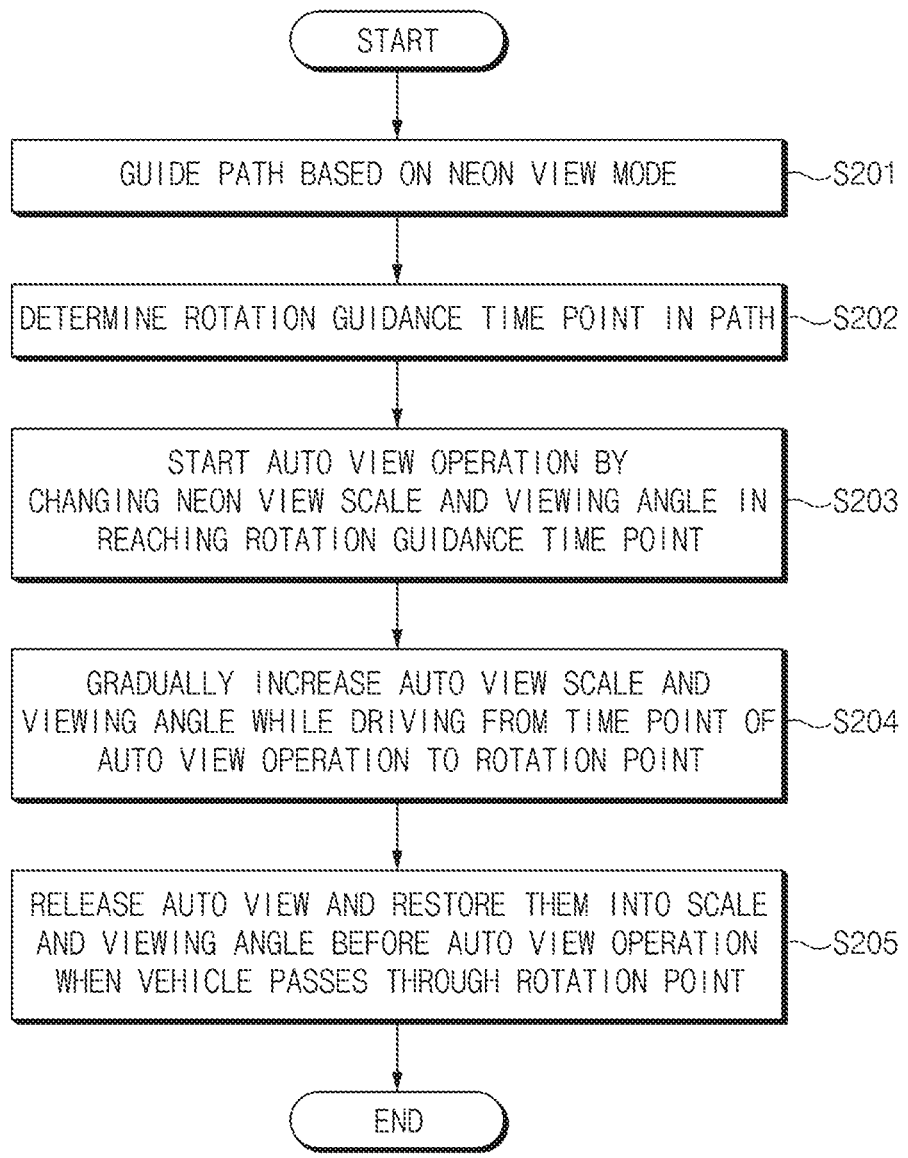
FIG. 19 illustrates a flowchart for describing a method for displaying vehicle information based on an auto view according to an exemplary embodiment of the present disclosure.

Hereinafter, a method of displaying vehicle information based on an auto view according to an exemplary embodiment of the present disclosure will be described in detail with reference to FIG. 19. FIG. 19 illustrates a flowchart for describing a method for displaying vehicle information based on an auto view according to an exemplary embodiment of the present disclosure.

Hereinafter, it is assumed that the display apparatus 100 of the vehicle of FIG. 1 performs a process of FIG. 19. In addition, in the description of FIG. 19, operations described as being performed by a device may be understood as being controlled by the controller 140 of the display apparatus 100.

When path guidance is performed in the neon view mode, the display apparatus 100 determines a type of the road on which the vehicle is driving and determines a rotation guidance time point (S201).

When the vehicle reaches the rotation guidance time point, the display apparatus 100 starts an auto view operation by changing a scale of a neon view map to a predetermined first size (e.g., 100 m) within a predetermined time and changing a viewing angle of the map to a predetermined value (S202).

Subsequently, the display apparatus 100 may increase a scale of the auto view to a second size (e.g., 25 m), and may gradually increase the viewing angle of the map to a predetermined value while the vehicle is driving from a time point of the auto view operation to a rotation point (S203).

When the vehicle passes through the rotation point, the display apparatus 100 releases the auto view within a predetermined time, and restores them into the scale and the viewing angle of the map before the auto view operation, to display the neon view (S205).

As described above, according to the present disclosure, it is possible to increase visibility by minimizing complex information such as text or POI when providing map information through the display apparatus 100 and by selecting only information that is essential to a driver (e.g., location information and path information) and displaying it based on the neon view.

According to the present disclosure, it is also possible to provide optimized map information by improving the expression method of maps, paths, arrows, etc. in order to supplement cognition depending on a reduction in the amount of information.

In addition, according to the present disclosure, additional information such as enlarged views or actual images for path guidance may be replaced by providing an auto view that adjusts a view and enlargement or reduction of the map.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. A display apparatus for a vehicle, comprising:
a controller configured to create a 3D map based on a neon view by selecting essential information among map information; and
a display device configured to display the 3D map based on the neon view created by the controller,
wherein the controller displays a structure on a background screen of the map information by using a shadow or displays the structure on a dark background screen by using an outline of the structure when the 3D map based on the neon view is created.

2. The display apparatus of claim 1, wherein the essential information includes at least one of current location information of a host vehicle, path information, time information, destination information, distance information remaining to a destination, or current time information.

3. The display apparatus of claim 1, wherein the controller differentially sets transparency of the structure on the 3D map by structural features or distance.

4. The display apparatus of claim 3, wherein the controller creates the 3D map by reducing transparency of buildings when the buildings are overlapped and displayed in the structure.

5. The display apparatus of claim 3, wherein the controller creates the 3D map by reducing transparency of a building when the building and a path are overlapped and displayed in the structure.

6. The display apparatus of claim 3, wherein the controller creates the 3D map by increasing transparency of the structure as a distance from a host vehicle to the structure is smaller.

7. The display apparatus of claim 1, wherein the controller sets at least one of a color, an edge, or a gradient effect of the structure on the 3D map.

8. The display apparatus of claim 7, wherein the controller differently sets colors of a wall surface and a roof surface of a building when the structure is the building.

9. The display apparatus of claim 7, wherein the controller sets at least one of transparency, a thickness, and a color of an outer line of the structure.

10. The display apparatus of claim 7, wherein the controller applies the gradient effect to a wall surface of a building when the structure is the building.

11. The display apparatus of claim 1, wherein the controller includes a light source based on a host vehicle on the 3D map.

12. The display apparatus of claim 1, wherein the controller dims or blurs a surrounding area except a central area where a path on the 3D map is displayed.

13. The display apparatus of claim 1, wherein the controller translucently processes a path line among essential information, separately transparently processes a portion of the path line, or processes the path line to be displayed in duplicate.

14. The display apparatus of claim 1, wherein the controller performs shadow processing on a mark representing a host vehicle on the 3D map.

15. The display apparatus of claim 1, wherein the controller displays a color of a fog area at an end portion of a horizon on the 3D map by applying an inverted color to a background color of the 3D map.

16. The display apparatus of claim 1, wherein the controller forms a host vehicle mark displayed on the 3D map to have a structure that is inclined in a predetermined direction.

17. The display apparatus of claim 1, wherein the controller, when providing detailed information of a rotation guidance point on the 3D map, starts to provide a map based on an auto view mode by reducing a scale of the 3D map based on the neon view and changing a viewing angle of the 3D map to a predetermined value when the host vehicle reaches a rotation guidance time point.

18. The display apparatus of claim 17, wherein the controller gradually increases a scale of the map based on an auto view mode and a viewing angle of the map from a time point at which the host vehicle starts the auto view mode to a time point at which it reaches a rotation point.

19. The display apparatus of claim 18, wherein the controller releases the auto view within a predetermined time, and restores the scale and the viewing angle of the map when the host vehicle passes through the rotation point.

20. The display apparatus of claim 1, wherein the controller displays a rotation direction on a path line of the rotation point.

21. The display apparatus of claim 18, wherein the controller displays a name of a travel direction and remaining distance information on a region that is close to the rotation point on the map based on the auto view mode.

22. A display method for a vehicle, comprising:
selecting, by a controller, essential information among map information;
creating, by the controller, a 3D map based on a neon view to display the essential information thereon; and
displaying, by a display device, the 3D map.

* * * * *